(12) United States Patent
Samaniego et al.

(10) Patent No.: US 8,174,539 B1
(45) Date of Patent: May 8, 2012

(54) IMPRINT FOR VISUALIZATION AND MANUFACTURING

(75) Inventors: Chris Samaniego, San Rafael, CA (US); Herbert Wolfram, San Rafael, CA (US)

(73) Assignee: Adobe Systems Incorporated, San Jose, CA (US)

( * ) Notice: Subject to any disclaimer, the term of this patent is extended or adjusted under 35 U.S.C. 154(b) by 917 days.

(21) Appl. No.: 11/839,473

(22) Filed: Aug. 15, 2007

(51) Int. Cl.
*G09G 5/00* (2006.01)

(52) U.S. Cl. ........ 345/619; 345/418; 345/419; 345/420; 345/581; 345/582; 345/629

(58) Field of Classification Search .................. None
See application file for complete search history.

(56) References Cited

U.S. PATENT DOCUMENTS

| | | | | |
|---|---|---|---|---|
| 5,894,844 | A * | 4/1999 | Rohrberg | 128/898 |
| 5,979,457 | A * | 11/1999 | Rohrberg | 600/443 |
| 6,295,513 | B1 | 9/2001 | Thackston | |
| 6,546,309 | B1 * | 4/2003 | Gazzuolo | 700/132 |
| 7,627,502 | B2 * | 12/2009 | Cheng et al. | 705/26 |
| 2001/0026272 | A1 * | 10/2001 | Feld et al. | 345/419 |
| 2002/0024517 | A1 * | 2/2002 | Yamaguchi et al. | 345/424 |
| 2002/0118190 | A1 * | 8/2002 | Greasley | 345/426 |
| 2003/0076318 | A1 * | 4/2003 | Shaw-Weeks | 345/419 |
| 2003/0110099 | A1 * | 6/2003 | Trajkovic et al. | 705/27 |
| 2005/0153764 | A1 * | 7/2005 | Sterchi et al. | 463/3 |
| 2009/0115777 | A1 * | 5/2009 | Reyers Moreno | 345/419 |
| 2009/0144173 | A1 * | 6/2009 | Mo et al. | 705/27 |

OTHER PUBLICATIONS

Title: Filter Effects—SVG 1.1 20030114, Author: SVG, Date: Jan. 14, 2003, pp. 1-72, Source:http://web.archive.org/web/20041231091347/http://www.w3.org/TR/SVG/filters.html.*
Title: Generation of Radiosity Texture Atlas for Realistic Real-Time Rendering, Author: Ray et al., Date: 2003, pp. 1-7, Source: EuroGraphics 2003.*

* cited by examiner

*Primary Examiner* — Kee M Tung
*Assistant Examiner* — Jwalant Amin
(74) *Attorney, Agent, or Firm* — Fish & Richardson P.C.

(57) ABSTRACT

Methods, systems, and apparatus, including computer program products, for generating a design image for manufacturing a designed object. In one aspect, a method includes receiving input specifying a visual design of an object in a first image, generating a second image based on the received input, mapping the second image to a surface having one or more contours based on one or more flow lines to generate a third image, presenting a composite of the third image with the first image, and providing the second image to an automated process for manufacturing the designed object.

27 Claims, 6 Drawing Sheets

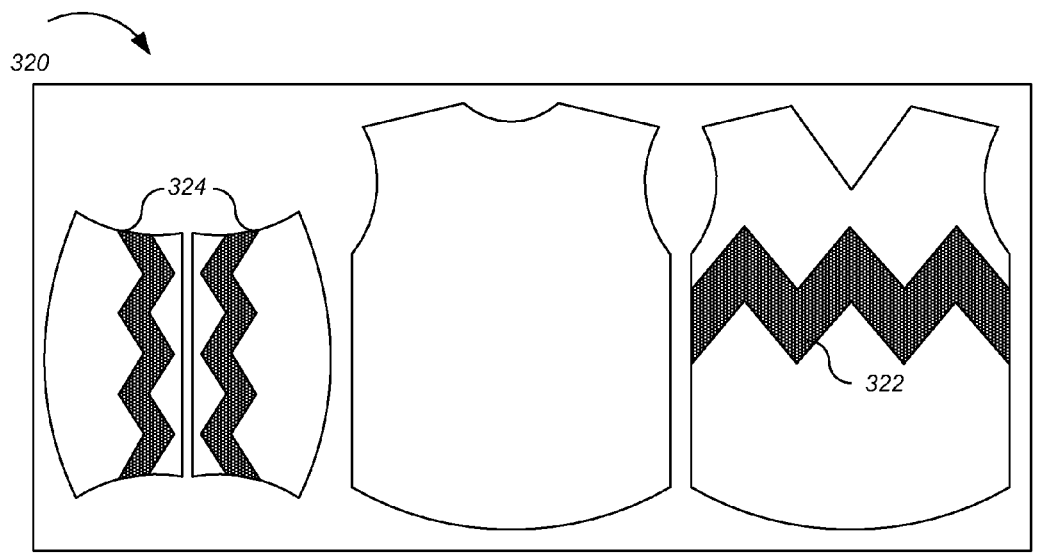
FIG. 3C
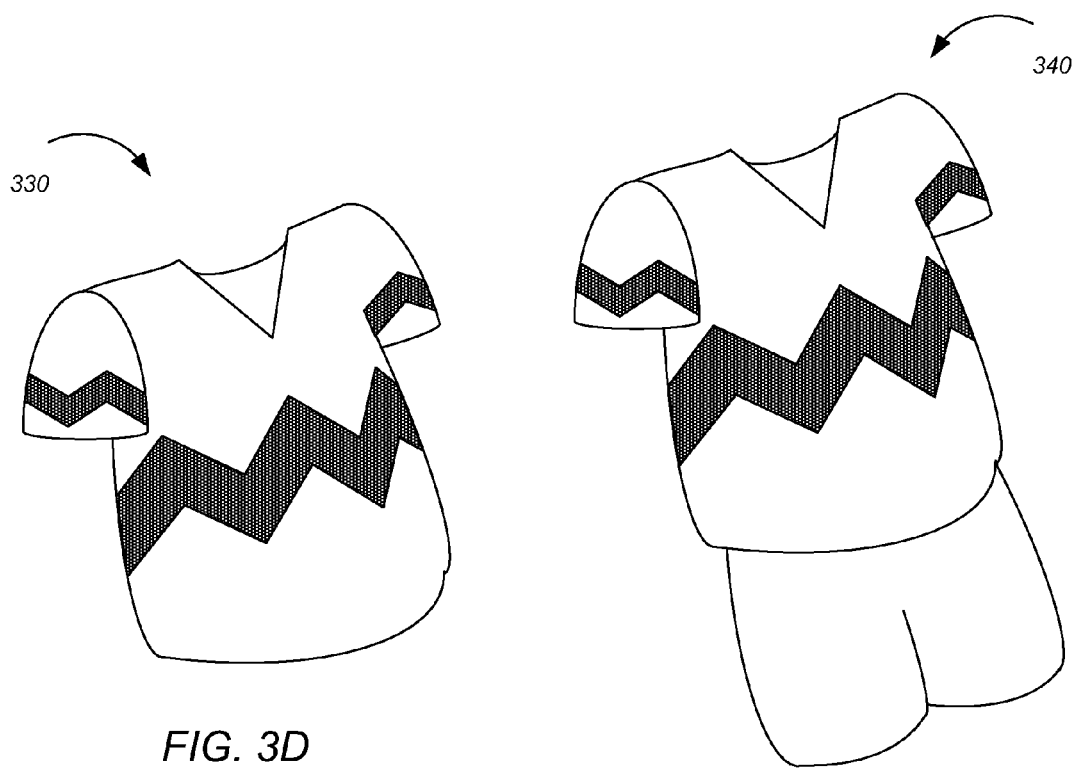
FIG. 3D
FIG. 3E

IMPRINT FOR VISUALIZATION AND MANUFACTURING

BACKGROUND

Some applications allow an object, such as a product, to be designed and visualized prior to manufacture of the object. An image of an unadorned object or a model of the object can be displayed to a user, e.g., a designer or a consumer, in a graphical user interface (GUI) provided on a display device. The image can be a digital image of the object created by taking a photograph of a basic model of the object. For example, if the object to be designed is an article of clothing, the digital image can be generated from a good quality digital photograph of the unadorned article of clothing, where the article is made of a minimal texture material in a neutral color without a pattern. The digital photograph can be converted to a composite document, e.g., a vignette, through a series of edits and additions. The vignette can be used to synthesize new images of the original object with specified design features. For example, a synthesized image of an article of clothing can be rendered in a display device for preview of the article of clothing in a different fabric, in a different color, or with a design feature, such as a logo or a monogram. The synthesized image of a designed object can be presented to a designer, allowing the designer to visualize a specified design prior to manufacture of the designed object.

SUMMARY

In general, one aspect of the subject matter described in this specification can be embodied in methods that include the actions of receiving input specifying a visual design of an object in a first image, generating a second image based on the received input, mapping the second image to a surface having one or more contours based on one or more flow lines to generate a third image, presenting a composite of the third image with the first image, and providing the second image to an automated process for manufacturing the designed object. Other embodiments of this aspect include corresponding systems, apparatus, and computer program products.

These and other embodiments can optionally include one or more of the following features. The input specifying a visual design can specify one or more of the following: a style, a color, a pattern, a logo, text, or a font. A graphical user interface can be provided for receiving the input specifying the visual design of the object. The one or more flow lines can be associated with the object in the first image and can be arranged to form a mesh, where the mesh has a surface with one or more contours. A texture map can be generated for mapping the second image to the surface. At least some portion of the second image can be mapped to the surface using the texture map, where the at least some portion of the second image conforms to the one or more contours of the surface. The third image can be rendered over the first image. A fourth image of the object can be generated and presented for previewing the visual design of the object. The first image can be generated from a photograph of the object, and the fourth image can be a photorealistic representation of the designed object as specified by the received input. The design object can be manufactured based on the second image. One or more computers operable to interact with a user interface device can include a server operable to interact with the user interface device through a data communication network. The user interface device can be operable to interact with the server as a client. The user interface device can include a personal computer running a web browser or a mobile telephone running a WAP browser. The one or more computers can include one personal computer, and the personal computer can include the user interface device.

Particular embodiments of the subject matter described in this specification can be implemented to realize one or more of the following advantages. A single master design imprint can be generated both to allow visualization of a specified product design and to be provided to a manufacturing process for the designed product. A synthesized image can accurately capture the appearance of the designed product for preview prior to the manufacture of the designed product. The design imprint can be provided directly to an automated manufacturing process, providing decreased manufacturing times while increasing the accuracy of the designed product.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3C illustrates a design imprint for the object including specified design features.

FIG. 3D illustrates a mapped design image for the designed object.

FIG. 3E illustrates a composite preview image including the designed object.

Like reference numbers and designations in the various drawings indicate like elements.

DETAILED DESCRIPTION

Figure 1A:
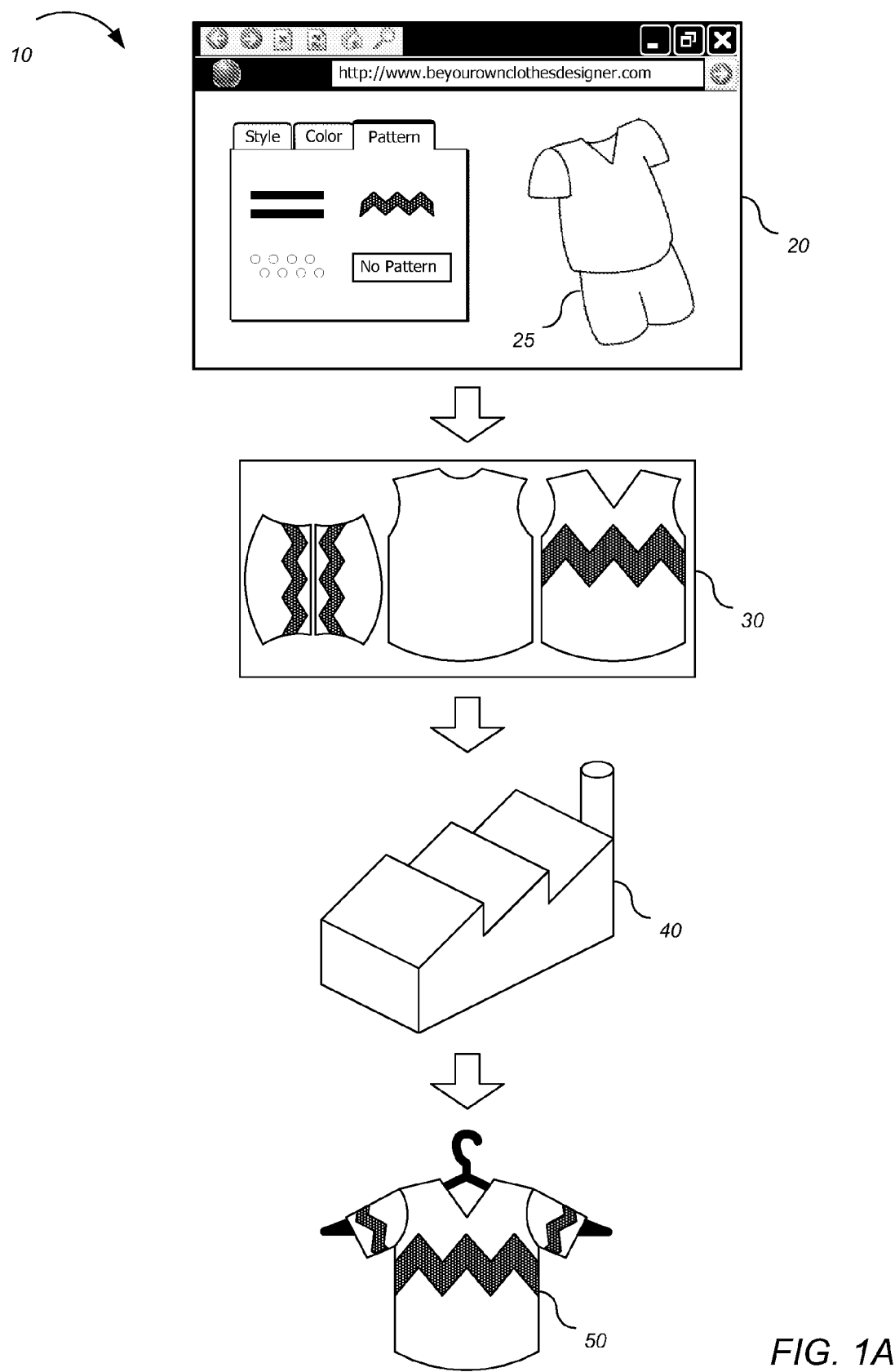
FIG. 1A illustrates an example process for generating a design imprint for manufacturing a designed object.

FIG. 1A illustrates an example process 10 for generating a design imprint 30 for manufacturing a designed object 50. A user (e.g., a designer or a customer) is presented with an image 25 of one or more customizable objects. For example, the image 25 can be displayed on a web site of a vendor that sells the customizable objects in the image 25. Some examples of customizable objects include clothes, cars, bicycles, protective gear, and computer cases. The user, viewing the rendered image 25 in a window 20 of a web browser, can select one or more visual design features (e.g., a style, a color, a pattern) for a customizable object in the image. The rendering of the image 25 can be updated to include the selected visual design features to allow the user to preview the designed object 50.

After the user has completed specifying the visual design of the object, a design imprint 30 is generated based on the user's design selections. The design imprint 30 can be an image that is imprinted on material as part of an automated process for manufacturing the designed object. For example, the design imprint 30 can be a fabric cut pattern for a shirt, where the fabric cut pattern includes the user selected design features.

The design imprint 30 is provided to a manufacturer 40 of the customizable object through, for example, a wired or wireless network connection. The design imprint 30 is used by the manufacturer 40 in an automated process for manufacturing the designed object 50 as configured by the user and specified by the design image 30. For example, the design imprint 30 can be printed on material which is cut and sewn to manufacture a user-designed shirt.

An image rendering pipeline can be used to generate a design imprint or image for manufacturing a designed object. The image rendering pipeline can generate design images on request using pre-authored vignettes and stored or uploaded texture files, font files, and logos, for example. The pre-authored vignettes can include preview masters of objects and other data. Generally, a preview master is an image that includes one or more pre-designed configurable objects. Different preview masters can be used to provide preview images of the configurable objects from different viewpoints (e.g., front view, back view, and side view). In some implementations, a pre-authored vignette includes a hierarchical representation of objects in a preview master to support identification of and access to the objects in the preview master. A pre-authored vignette can also include one or more illumination maps, one or more object masks, information about the rendering capabilities of the objects in the preview master, or information about the position or z-order of the objects in the preview master. An image rendering pipeline can synthesize images of re-colored or re-textured objects or products in a preview master in a photorealistic manner. That is, the synthesized images can give the appearance of being captured from the real world, e.g., as a photograph. Synthesizing images provides the ability to preview any of a large number of configurations of design choices without the need to capture real world images of the configured products.

Figure 1B:
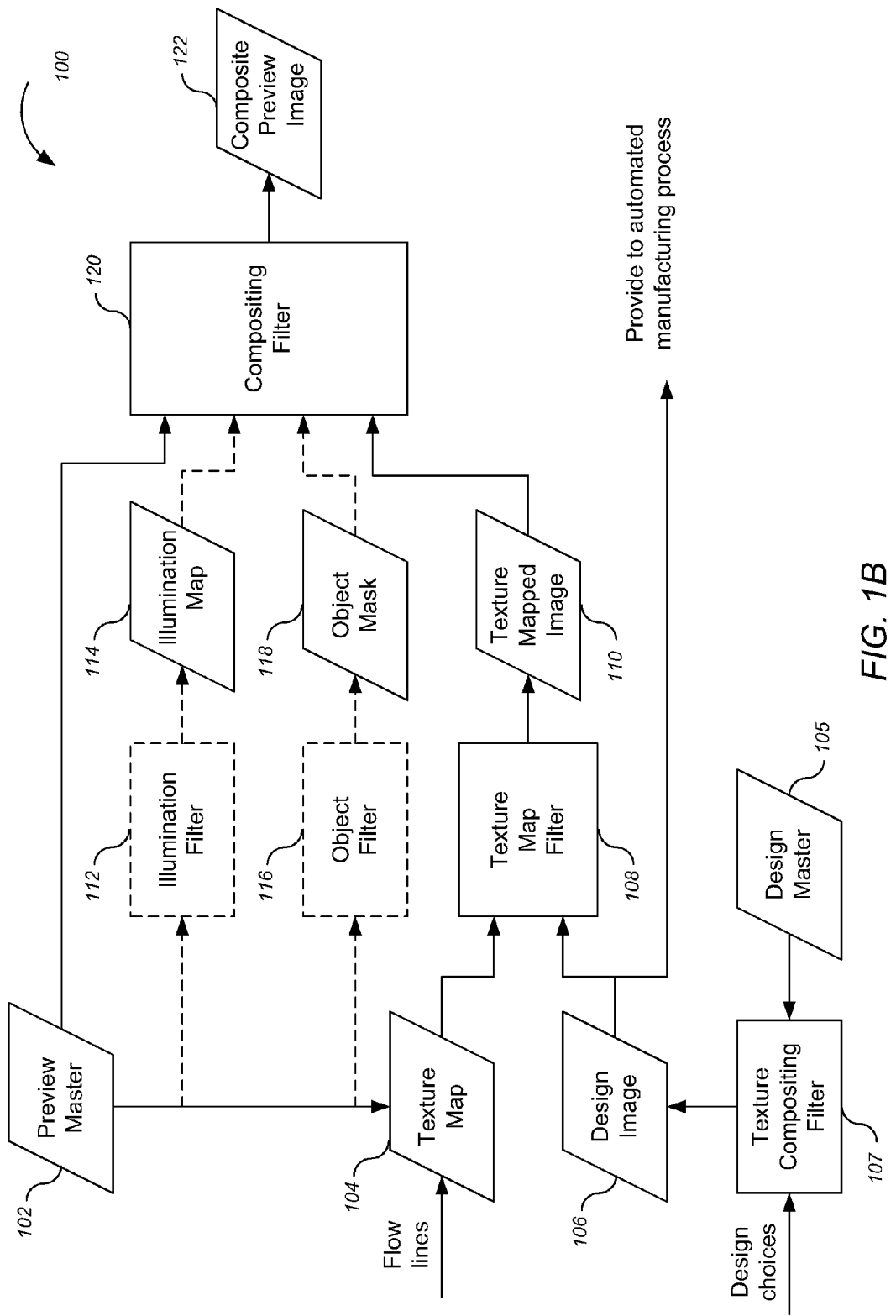
FIG. 1B is a block diagram illustrating an image rendering pipeline for generating a design imprint for visualization and manufacturing.

As shown in FIG. 1B, a block diagram illustrates an image rendering pipeline 100 for generating a design imprint for visualization and manufacturing. The image rendering pipeline 100 accepts as input a preview master 102 of one or more customizable objects and generates a composite preview image 122 of the preview master 102 with at least one designed or configured object. The image rendering pipeline 100 also outputs a design image 106 (e.g., design imprint 30 of FIG. 1A) which is provided to an automated manufacturing process for the configured object.

In some implementations, the preview master 102 can be part of a pre-authored vignette. For example, the preview master 102 can be a color digital photograph of a model wearing an athletic shoe. The vignette can also include additional data, such as coordinates representing anchor points associated with locations on the athletic shoe for placement of specified design features. To facilitate synthesizing images, the athletic shoe worn by the model can be made from a smooth or minimally textured material, such as matte leather or canvas, in a neutral color, e.g., gray or white. Such a neutral model shoe can be used to generate synthesized images of the shoe configured with a variety of materials, e.g., patent leather or suede, in a variety of colors or patterns. In this example, the athletic shoe is an object in the preview master 102 which can be re-textured or customized with a different material, in a different color, or with specified design features (e.g., a logo). In the example of FIG. 1A, the shirt and shorts in image 25 can be customized by style, color, or pattern. Re-texturing applies a new texture, pattern, or design feature to an object in a preview master 102 to synthesize a photorealistic image which appears to show the object instantiated in the new texture or pattern or with the new design feature.

The preview master 102 can be used in the generation of one or more texture maps 104. A texture map 104 is associated with a re-texturable object in the preview master 102. For example, a texture map 104 can be generated for the shirt in image 25 of FIG. 1A or for the athletic shoe from the digital photograph of the model wearing the athletic shoe. A texture map 104 specifies a two-component texture coordinate for each pixel of a re-texturable object in the preview master displayed on a display screen. A texture coordinate determines which part of a design image 106 will be mapped (i.e., applied) to a particular pixel of the object being re-textured. That is, the texture map 104 can map a U-V texture coordinate of a design image 106 (e.g., design imprint 30 of FIG. 1A) to a pixel corresponding to an X-Y coordinate of the re-texturable object in the preview master 102. The use of a texture map allows the expression of a general relationship between a design image 106 and a re-texturable object for applying the design image 106 to the re-texturable object in a realistic manner. For example, for a non-planar re-texturable object with a surface having one or more contours (e.g., a shirt with creases or a shoe with an arch), the mapping relationship between the object and the design image 106 can be difficult to capture with a geometric expression. In some implementations, a texture map 104 is generated using a preview master 102 by creating one or more flow lines to simulate the shape of the re-texturable object, as described in more detail below.

A design image 106 corresponds to a texture map 104 associated with a re-texturable object in the preview master 102. The design image 106 (e.g., design imprint 30 of FIG. 1A) is an image of a designed version of a configurable object in the preview master 102. The design image 106 can be generated from a design master 105 and design choices using a texture compositing filter 107. A design master 105 can be a base image template of a pre-designed configurable object in the preview master 102. For example, a design master 105 for the shirt in image 25 of FIG. 1A can be a fabric cut piece including a front section, a back section, and sleeves without any visual design features. In some implementations, a design master 105 includes data identifying locations or regions of the configurable object where visual design features can be placed (e.g., colorable regions or anchor points).

The texture compositing filter 107 can combine one or more design choices (e.g., specified textures or design features) with the design master 105 to generate the design image 106. The design choices can be incorporated as one or more texture images. Design choices can include, for example, colors, text blocks, fonts, font styles, layer effects (e.g., drop shadow or embossing), graphics (e.g., logos or mascots), non-repeatable images (e.g., photographs), and repeated background texture fills. Examples of background texture fills which can be repeated include fabric textures (e.g., pebble-grained or seersucker) and patterns (e.g., stripes or floral). The design image 106 can incorporate an arbitrary number of design choices in different combinations. For example, multiple text elements with different colors, fonts, and effects can be combined with multiple logo images and layered over solid or textured backgrounds. In some implementations, each specified design choice is represented by a separate texture image. Alternatively, all the specified design choices for a re-texturable object can be incorporated into a single texture image.

In addition to using specified design choices, a design image 106 can also be generated using other parameters (e.g., a size for the object) that can be specified or pre-determined, such as default settings. For example, a consumer or a designer can specify a new color and a new pattern for an athletic shoe, and a design image 106 can be generated to incorporate these choices and a default value for a shoe size parameter.

The design image 106 can be provided to an automated manufacturing process for the designed object. For example, once a consumer is satisfied with the specified design choices, the completed design image 106 can be provided directly to the manufacturer of the object (e.g., the manufacturer 40 of the designed shirt 50 of FIG. 1A) to be used in an automated process for manufacturing the object as configured by the consumer and specified by the design image 106. In some implementations, the design image 106 is generated at a high resolution, and a lower resolution production version of the design image 106 is provided to the manufacturer of the object for production of the designed object. In some implementations, the production version of the design image 106 set to the manufacturer is reformatted, e.g., color conversion or file format conversion, to accommodate the manufacturer's production process.

In some implementations, the design image 106 can be a design imprint that can be imprinted or sublimation printed on material used to manufacture the configured object (e.g., the designed shirt 50 of FIG. 1A). In some implementations, the design image 106 is printed on a transfer medium (e.g., a transfer film) using inks or dyes transferable to material used to manufacture the configured object. In some implementations, the design image 106 is a fabric cut pattern or a decal.

For example, if a consumer specified a color and pattern for a canvas athletic shoe, the design image 106 can be a fabric cut pattern for the shoe with the specified color and pattern. The fabric cut pattern can include individual pieces for specific portions of the shoe that are to be made of canvas. At the manufacturer, the fabric cut pattern of the design image 106 can be sublimation printed on canvas. The printed shoe pieces can be cut from the canvas along the individual pattern lines, and these pieces can be assembled with other materials to produce the configured shoe.

The design image 106 is filtered by a texture map filter 108 using the texture map 104. The texture map filter 108 indexes into the design image 106 using the texture map 104 for the re-texturable object to generate the texture mapped image 110 of the configured object. That is, the texture map filter 108 maps portions of the design image 106 to the pixels of the re-texturable object. The texture mapped image 110 is a photorealistic image of the configured object. The texture mapped image 110 can be a raster image, where each pixel of the texture mapped image 110 is associated with a color in the Red, Green, Blue (RGB) color model. In some implementations, each pixel of the texture mapped image 110 can also be associated with a transparency value.

In some implementations, a preview version of the design image 106 filtered by the texture map filter 108 is a lower resolution version of the design image 106 generated from the design master 105. For example, to quickly generate and render a composite preview image 122 for the user to preview specified design choices, it is generally more efficient to process images with lower resolutions than images with higher resolutions (e.g., the design image 106 generated from the design master 105). In some implementations, the preview version of the design image 106 has the same resolution as the production version of the design image 106. In other implementations, the resolutions of the preview version and the production version of the design image 106 differ. For example, the production version may have a higher resolution than the preview version. The texture mapped image 110 of the configured object can be composited with the preview master 102 using a compositing filter 120 to generate a composite preview image 122. The composite preview image 122 includes the one or more objects of the preview master 102, where the configured object appears as specified by the design choices. In some implementations, the compositing filter 120 generates the composite preview image 122 by rendering the texture mapped image 110 of the configured object over the associated un-configured object in the preview master 102. For example, a texture mapped image of the configured athletic shoe can be rendered over the unadorned shoe of the preview master 102 with all other portions of the preview master 102 remaining the same in the composite preview image 122 as the background for the configured object.

In some implementations, the compositing filter 120 generates the composite preview image 122 using one or both of an illumination map 114 and an object mask 118 in addition to the preview master 102 and the texture mapped image 110. Like the texture map 104, one or more illumination maps 114 and one or more object masks 118 can be generated using the preview master 102. An illumination map 114 can be generated by filtering the preview master 102 using an illumination filter 112. An illumination map 114 specifies the lighting value to be used at each pixel of an object in the preview master 102 to be re-textured. An object mask 118 can be generated by filtering the preview master 102 using an object filter 116. An object mask 118 identifies the location of a re-texturable object in the preview master 102. In some implementations, the image rendering pipeline 100 re-textures an object in the preview master 102 by combining an input color from the texture mapped image 110 with an input lighting value from the illumination map 114 to produce an output color for each pixel in the object being re-textured, where the re-texturable object is identified by the object mask 118. Combining the texture mapped image 110 with the lighting values from the illumination map 114 effectively applies scene lighting to the texture mapped image 110. In some implementations, the illumination map 114 and the object mask 118 are raster images, for example, gray-scale raster images. In some implementations, a vignette includes the preview master 102 and additional data for generating one or more of a texture map 104, an illumination map 114, or an object mask 118.

Figure 2:
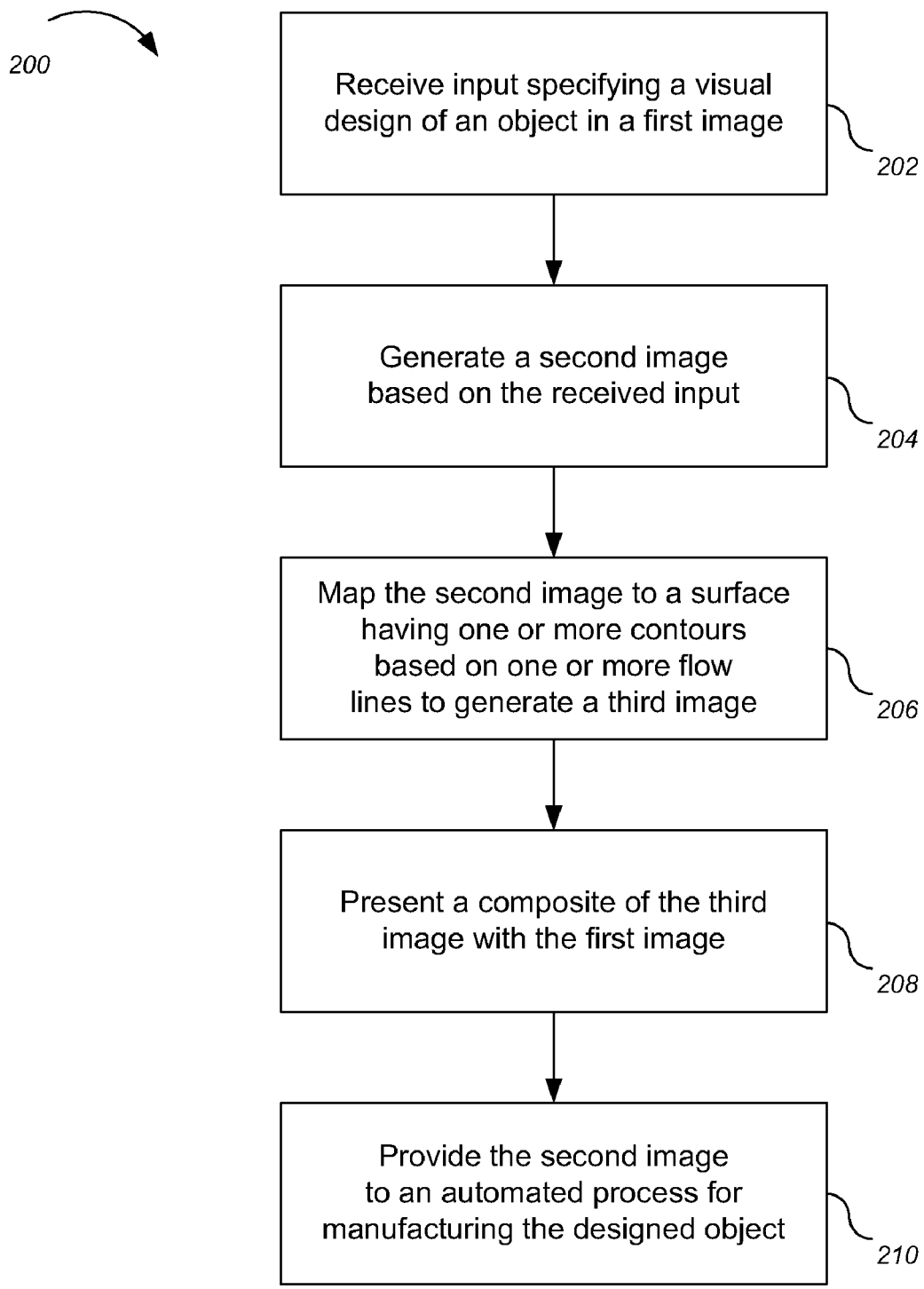
FIG. 2 is a flow diagram illustrating a method of generating a design imprint for visualization and manufacturing.

FIG. 2 is a flow diagram illustrating a method 200 of generating a design imprint for visualization and manufacturing. The description of the method 200 will be referenced to the example of FIGS. 3A-3E. The rendering of the re-texturable objects and the generation of a design imprint for visualization and manufacturing can be performed using a software as a service (SaaS) delivery model, where a vendor of the visualization software hosts and operates the visualization application over the Internet using one or more servers remote to the vendor of the re-texturable objects.

Figure 3A:
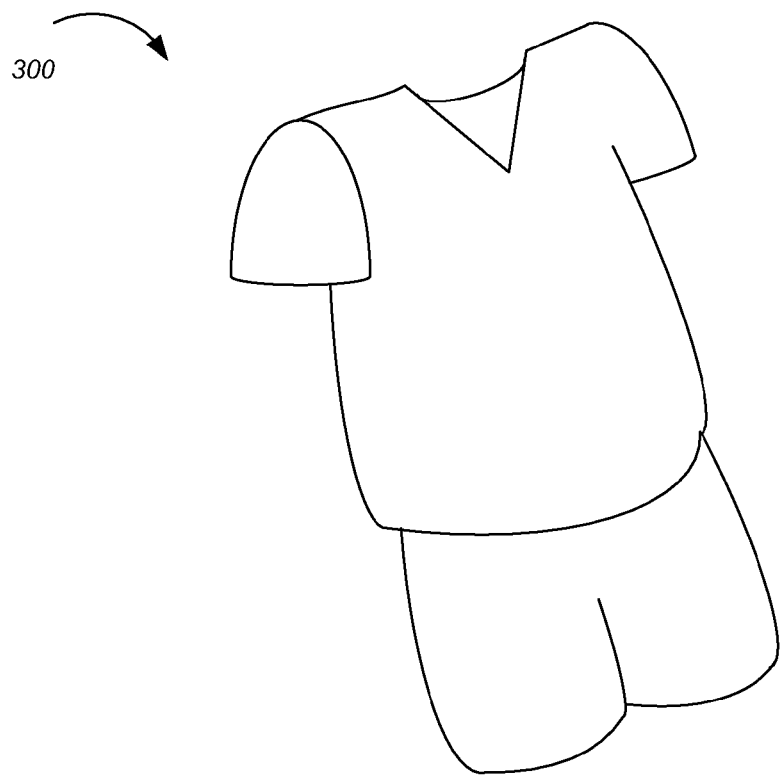
FIG. 3A illustrates a preview master of objects to be designed.

FIG. 3A illustrates a preview master 300 of objects to be designed. The preview master 300 includes two re-texturable objects: a shirt and a pair of shorts. The preview master 300 can be displayed in a GUI window on a display device (e.g., a computer screen). For example, the preview master 300 can be rendered in the window of a user's web browser. The user (e.g., a customer or a designer) can view the preview master 300 on the web site of a vendor that sells the re-texturable shirt and shorts in the preview master 300.

Figure 3B:
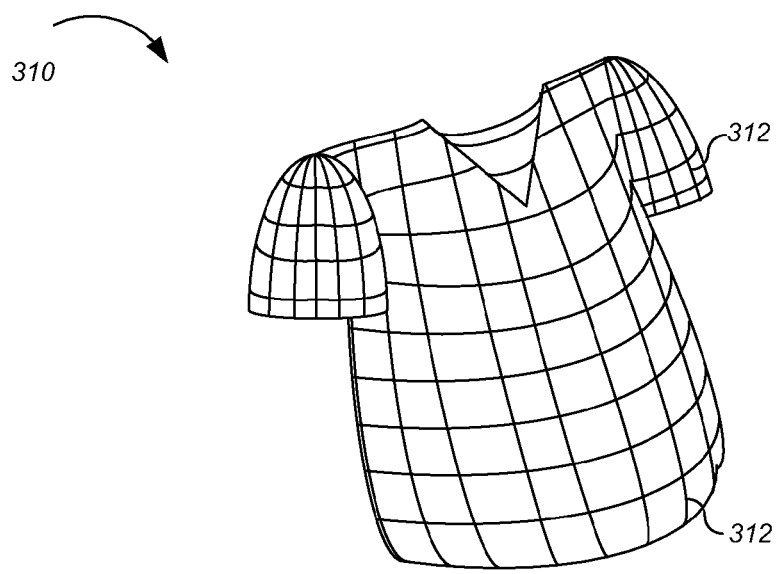
FIG. 3B illustrates a flow line mesh for one of the objects.

FIG. 3B illustrates a flow line mesh 310 for one of the objects of the preview master 300. In the example, the flow line mesh 310 simulates the non-planar surface of the re-texturable shirt in the two-dimensional preview master 300. The flow line mesh 310 acts as a virtual three-dimensional model that can be used to create a photorealistic rendering of a synthesized image of the shirt instantiated in a specified texture. For example, the flow line mesh 310 can be used to simulate the natural flow of shirt fabric over one or more contours of a model. The flow line mesh 310 allows the specified texture to conform to the simulated surface of the object to be re-textured, giving the perception of depth in the object without needing to generate a three-dimensional model of the object. In some implementations, the flow line mesh 310 can be generated from the preview master 300 using an image authoring tool. For example, one or more flow lines 312 can be generated and arranged to form a flow line mesh 310, where the flow lines 312 are associated with a re-texturable object in the preview master 300.

In some implementations, a flow line tool allows an author to interactively manipulate one or more flow lines 312, which can default initially to equally-spaced vertical and horizontal lines forming a closed flow line mesh 310. Overlay renderings using a test texture can be produced in real time to show the author the effect that the flow line manipulation would have on a texture map that would be generated from the flow line mesh 310. In some implementations, the flow lines 312 are represented as continuous gradient cubic splines. Generally, the flow line mesh 310 for a re-texturable object is pre-authored before the re-texturable object is available for design on a SaaS network.

A texture map can be generated from the flow line mesh 310. As described above, a texture map can specify a two-component texture coordinate for each pixel of a re-texturable object, where the texture coordinate determines which part of a texture or design image will be mapped (i.e., applied) to a particular pixel of the object being re-textured.

In step 202 of the method 200, input specifying a visual design of an object in a first image (e.g., the preview master 300) is received. In some implementations, the input specifying the visual design of an object can be received through a provided GUI. In the example of FIGS. 3A-3E, the re-texturable shirt is selected for design. Examples of design choices which can be specified for a re-texturable object can include a style, a color, a pattern, a logo, text, or a text font.

A second image is generated based on the received input specifying the visual design of the object (step 204). A design imprint 320, illustrated in FIG. 3C, is generated based on received input specifying the visual design of the re-texturable shirt in the preview master 300. The design imprint 320 includes zigzag patterns 322, 324 as specified design features for the re-texturable shirt. In some implementations, the design imprint 320 is generated using a template (e.g., a design master).

In some implementations, the preview master 300 is part of a vignette generated from a photograph of the re-texturable objects. The vignette can include one or more anchor points for placement of one or more design features. Selection of a design feature for a re-texturable object can include selection of an anchor point associated with a location on the re-texturable object for placement of the selected design feature. In the example, the zigzag pattern 322 is placed across the front of the re-texturable shirt, while the zigzag patterns 324 are placed near the edges of the sleeves of the re-texturable shirt. The design imprint 320 is generated with the specified design features placed in locations (e.g., anchor points of a design master) associated with the selected anchor points of the vignette.

In some implementations, the design imprint 320 includes one or more cut pieces for imprinting or sublimation printing on material to manufacture the designed object. Alternatively, the design imprint 320 can be imprinted on an intermediate medium (e.g., transfer film or a decal) for further application to the actual material used to manufacture the object. In the present example, the design imprint 320 includes a front portion, a back portion, and two sleeve portions for the re-texturable shirt.

The second image is mapped to one or more flow lines to generate a third image (step 206). As illustrated in FIG. 3D, the design imprint 320 is mapped to the flow line mesh 310 to generate a mapped design image 330 of the designed object. In some implementations, at least some portion of the design imprint 320 is mapped to (e.g., wrapped around) the flow line mesh 310 using a texture map, which specifies a texture coordinate of the design imprint 320 for each pixel of the object being re-textured. The portion of the design imprint 320 mapped to the flow line mesh 310 conforms to the one or more contours of the surface of the flow line mesh 310.

The third image is composited with the first image of the object (step 208). In some implementations, compositing the third image and the first image generates a fourth image which can be presented for previewing the design of the object. As illustrated in FIG. 3E, the mapped design image 330 is composited with the preview master 300 to generate a composite preview image 340 including the designed shirt. In some implementations, the composite preview image 340 can be generated by compositing one or both of an illumination map or an object mask with the mapped design image 330 of the designed object. In some implementations, the composite preview image 340 is a photorealistic representation of the designed object as specified by the received input.

In some implementations, compositing the mapped design image 330 with the preview master 300 includes rendering the mapped design image 330 of the designed object over the pre-designed object in the preview master 300. All other portions of the preview master 300 can appear in the background of the composite preview image 340. For example, the preview master 300 can be generated from a photograph of a model wearing the re-texturable shirt and shorts. Synthesizing a photorealistic image of the model wearing the designed shirt and the shorts allows the designer or consumer to accurately preview the result of the specified design choices prior to approving the design of the shirt, as configured. If preview masters from multiple perspectives are available of the pre-designed texturable object, and the design imprint 320 includes all or a majority of the cut pieces used to manufacture the designed object, multiple preview images for the designed object can be generated from multiple perspectives (e.g., front view, back view, and side view).

In some implementations, the preview master 300 displayed in a display device is a two-dimensional representation of a three-dimensional model of one or more objects. The surface of a three-dimensional model of a re-texturable object can be used directly to generate a flow line mesh for the object.

The second image is provided to an automated process for manufacturing the designed object (step 210). The design imprint 320 or a scaled resolution version of the design imprint 320 can be provided to the manufacturer of the shirt to be used in an automated process for creating the configured shirt. In some implementations, the design imprint 320 is a fabric cut pattern. In some implementations, the design imprint 320 can be imprinted on a decal, a label, a magnet, or a faceplate to be applied to the re-texturable object.

In some implementations, the design imprint 320 can be imprinted or dye-sublimation printed on material as part of an automated process for manufacturing the designed object. Alternatively, the design imprint 320 can be printed on a transfer medium for further application to the actual material to be used to manufacture the designed object. For example, in dye-sublimation printing, printers spray dye-sublimation ink held in a liquid solvent on a transfer medium. In some implementations, the design imprint 320 is printed in reverse on the transfer medium, allowing the reversed image to be heat transferred to the actual material used to manufacture the designed object.

In some implementations, the design imprint 320 is a Tagged Image File Format (TIFF) document. The design imprint 320 can be transmitted to the manufacturer as a TIFF document. In some implementations, the design imprint 320 is generated in one file format and transmitted to the manufacturer in another file format. Alternatively, parametric information representing the specified design choices can be exported to the manufacturer, and a local image server at the manufacturer can automatically generate from the parametric information the design imprint 320 as a TIFF document or other file format document to be used directly in the manufacturing process for the designed object. In some implementations, a TIFF document generated by a local image server at the manufacturer is of a higher resolution than the resolution of the design imprint 320 used to generate a composite preview image 340.

Figure 4:
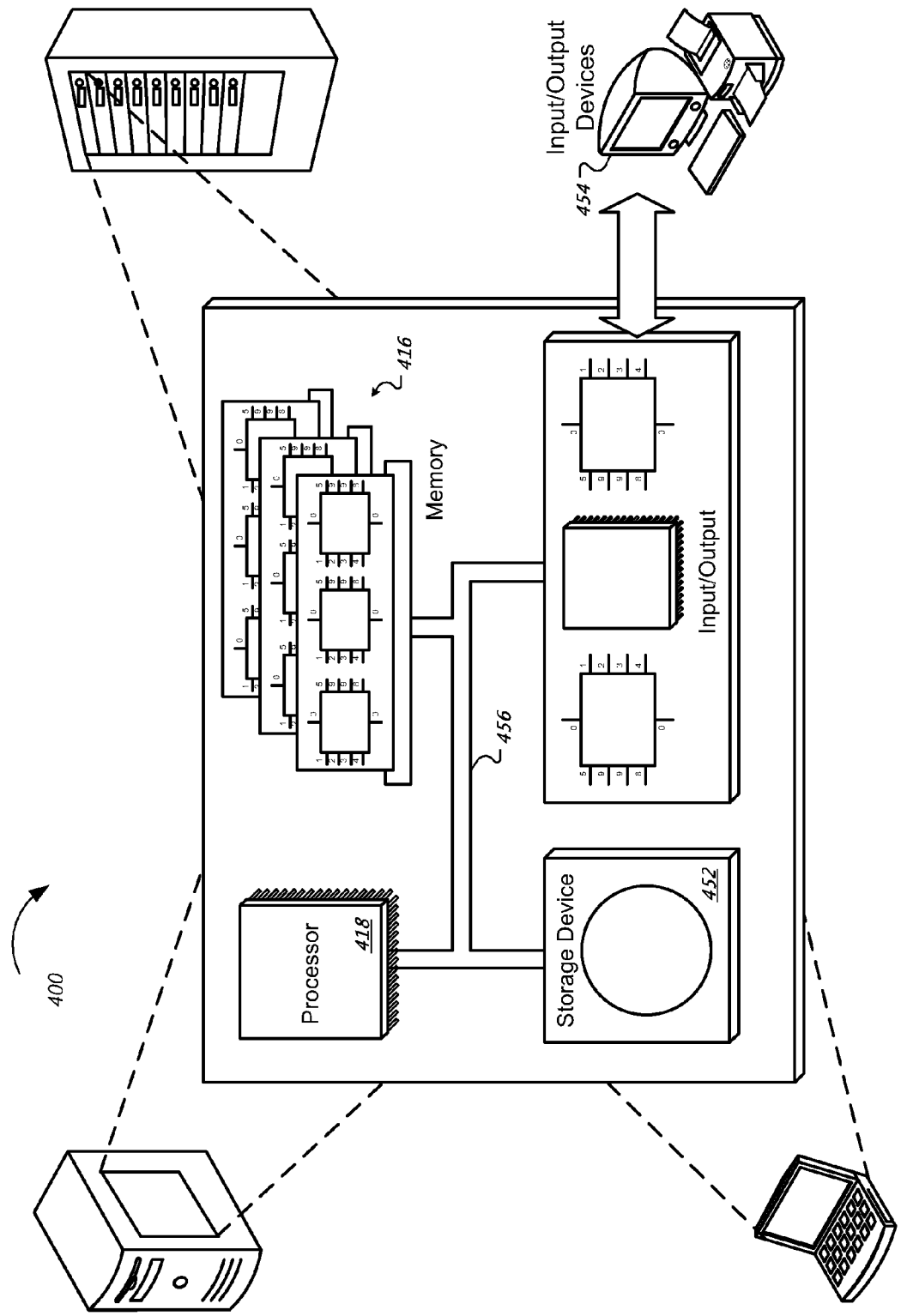
FIG. 4 is a schematic diagram of an example computer system.

FIG. 4 is a schematic diagram of an example computer system 400. The system 400 can be used for performing the actions and methods described above. The system 400 can include a processor 418, a memory 416, a storage device 452, and input/output devices 454. Each of the components 418, 416, 452, and 454 are interconnected using a system bus 456. The processor 418 is capable of processing instructions within the system 400. These instructions can implement one or more aspects of the systems, components, and techniques described above. In some implementations, the processor 418 is a single-threaded processor. In other implementations, the processor 418 is a multi-threaded processor. The processor 418 can include multiple processing cores and is capable of processing instructions stored in the memory 416 or on the storage device 452 to display graphical information for a user interface on the input/output device 454.

The memory 416 is a computer readable medium such as volatile or non-volatile that stores information within the system 400. The memory 416 can store processes related to the functionality of the image rendering pipeline 100, for example. The storage device 452 is capable of providing persistent storage for the system 400. The storage device 452 can include a floppy disk device, a hard disk device, an optical disk device, or a tape device, or other suitable persistent storage mediums. The storage device 452 can store the various databases described above. The input/output device 454 provides input/output operations for the system 400. The input/output device 454 can include a keyboard, a pointing device, and a display unit for displaying graphical user interfaces.

The computer system shown in FIG. 4 is but one example. In general, embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving input specifying a visual design of an object in a first image;
   generating a second image based on the received input;
   mapping the second image to a surface having one or more contours based on one or more flow lines to generate a third image;
   presenting a composite of the third image with the first image, wherein the composite of the third image with the first image is produced from an illumination map and an object mask, wherein the illumination map is produced by filtering the first image using an illumination filter and the object mask is produced by filtering the first image using an object filter; and
   providing the second image to an automated process for manufacturing the designed object.

2. The method of claim 1, where the input specifying a visual design specifies one or more of the following: a style, a color, a pattern, a logo, text, or a font.

3. The method of claim 1, further comprising:
   providing a graphical user interface for receiving the input specifying the visual design of the object.

4. The method of claim 1, where the one or more flow lines are associated with the object in the first image and are arranged to form a mesh, the mesh having the surface with one or more contours.

5. The method of claim 4, where mapping the second image to the surface to generate the third image further comprises:
   generating a texture map for mapping the second image to the surface; and
   mapping at least some portion of the second image to the surface using the texture map, the at least some portion of the second image conforming to the one or more contours of the surface.

6. The method of claim 1, where presenting a composite of the third image with the first image further comprises:
   rendering the third image over the first image.

7. The method of claim 1, where presenting a composite of the third image with the first image further comprises:
   generating and presenting a fourth image of the object for previewing the visual design of the object.

8. The method of claim 7, where
   the first image is generated from a photograph of the object; and
   the fourth image is a photorealistic representation of the designed object as specified by the received input.

9. A computer program product, encoded on a computer readable storage device, operable to cause data processing apparatus to perform operations comprising:
   receiving input specifying a visual design of an object in a first image;
   generating a second image based on the received input;
   mapping the second image to a surface having one or more contours based on one or more flow lines to generate a third image;
   presenting a composite of the third image with the first image, wherein the composite of the third image with the first image is produced from an illumination map and an object mask, wherein the illumination map is produced by filtering the first image using an illumination filter and the object mask is produced by filtering the first image using an object filter; and providing the second image to an automated process for manufacturing the designed object.

10. The computer program product of claim 9, where the input specifying a visual design specifies one or more of the following: a style, a color, a pattern, a logo, text, or a font.

11. The computer program product of claim 9, further comprising:

providing a graphical user interface for receiving the input specifying the visual design of the object.

12. The computer program product of claim 9, where the one or more flow lines are associated with the object in the first image and are arranged to form a mesh, the mesh having the surface with one or more contours.

13. The computer program product of claim 12, where mapping the second image to the surface to generate the third image further comprises:

generating a texture map for mapping the second image to the surface; and mapping at least some portion of the second image to the surface using the texture map, the at least some portion of the second image conforming to the one or more contours of the surface.

14. The computer program product of claim 9, where presenting a composite of the third image with the first image further comprises:

rendering the third image over the first image.

15. The computer program product of claim 9, where presenting a composite of the third image with the first image further comprises:

generating and presenting a fourth image of the object for previewing the visual design of the object.

16. The computer program product of claim 15, where the first image is generated from a photograph of the object; and the fourth image is a photorealistic representation of the designed object as specified by the received input.

17. A system comprising:

a user interface device; and one or more computers operable to interact with the user interface device and to receive input specifying a visual design of an object in a first image;

generate a second image based on the received input;

map the second image to a surface having one or more contours based on one or more flow lines to generate a third image;

present a composite of the third image with the first image, wherein the composite of the third image with the first image is produced from an illumination map and an object mask, wherein the illumination map is produced by filtering the first image using an illumination filter and the object mask is produced by filtering the first image using an object filter; and provide the second image to an automated process for manufacturing the designed object.

18. The system of claim 17, where the input specifying a visual design specifies one or more of the following: a style, a color, a pattern, a logo, text, or a font.

19. The system of claim 17, where the user interface device is operable to receive the input specifying the visual design of the object.

20. The system of claim 17, where the one or more flow lines are associated with the object in the first image and are arranged to form a mesh, the mesh having the surface with one or more contours.

21. The system of claim 20, where mapping the second image to the surface to generate the third image further comprises:

generating a texture map for mapping the second image to the surface; and mapping at least some portion of the second image to the surface using the texture map, the at least some portion of the second image conforming to the one or more contours of the surface.

22. The system of claim 17, where presenting a composite of the third image with the first image further comprises:

rendering the third image over the first image.

23. The system of claim 17, where presenting a composite of the third image with the first image further comprises:

generating and presenting a fourth image of the object for previewing the visual design of the object.

24. The system of claim 23, where the first image is generated from a photograph of the object; and the fourth image is a photorealistic representation of the designed object as specified by the received input.

25. The system of claim 17, wherein the one or more computers comprise a server operable to interact with the user interface device through a data communication network, and the user interface device is operable to interact with the server as a client.

26. The system of claim 25, wherein the user interface device comprises a personal computer running a web browser or a mobile telephone running a WAP browser.

27. The system of claim 17, wherein the one or more computers comprises one personal computer, and the personal computer comprises the user interface device.

* * * * *

UNITED STATES PATENT AND TRADEMARK OFFICE
CERTIFICATE OF CORRECTION

| | | |
|---|---|---|
| PATENT NO. | : 8,174,539 B1 | Page 1 of 1 |
| APPLICATION NO. | : 11/839473 | |
| DATED | : May 8, 2012 | |
| INVENTOR(S) | : Chris Samaniego et al. | |

It is certified that error appears in the above-identified patent and that said Letters Patent is hereby corrected as shown below:

Title Page and Col. 1, Line 1 (Title), Before "IMPRINT" insert -- DESIGN --

Signed and Sealed this
Second Day of October, 2012

David J. Kappos
*Director of the United States Patent and Trademark Office*